United States Patent
Kao et al.

(10) Patent No.: US 12,345,031 B2
(45) Date of Patent: Jul. 1, 2025

(54) SWITCHING-TYPE WATER SAVING VALVE

(71) Applicant: Neoperl AG, Reinach (CH)

(72) Inventors: Chih-Hung Kao, New Taipei (TW); Chin-Yuan Hsiao, New Taipei (TW)

(73) Assignee: NEOPERL AG, Reinach (CH)

( * ) Notice: Subject to any disclaimer, the term of this patent is extended or adjusted under 35 U.S.C. 154(b) by 360 days.

(21) Appl. No.: 17/792,276

(22) PCT Filed: Jan. 15, 2021

(86) PCT No.: PCT/IB2021/050289
§ 371 (c)(1),
(2) Date: Jul. 12, 2022

(87) PCT Pub. No.: WO2021/144749
PCT Pub. Date: Jul. 22, 2021

(65) Prior Publication Data
US 2023/0039121 A1 Feb. 9, 2023

(30) Foreign Application Priority Data

Jan. 16, 2020 (TW) .................................. 109101498

(51) Int. Cl.
*E03C 1/084* (2006.01)
*B01D 35/04* (2006.01)
(Continued)

(52) U.S. Cl.
CPC .............. *E03C 1/084* (2013.01); *B01D 35/04* (2013.01); *B05B 1/1654* (2013.01); *B05B 1/18* (2013.01); *B05B 7/0425* (2013.01); *F16K 11/22* (2013.01)

(58) Field of Classification Search
CPC . E03C 1/08; E03C 1/084; E03C 1/086; B05B 1/1627; B05B 1/1636;
(Continued)

(56) References Cited

U.S. PATENT DOCUMENTS 3,829,026 A * 8/1974 Aghnides ................ E03C 1/084
239/394
4,221,338 A * 9/1980 Shames .................... E03C 1/084
239/449

(Continued)

FOREIGN PATENT DOCUMENTS

EP 3587679 1/2020
GB 2525504 10/2015
(Continued)

*Primary Examiner* — Darren W Gorman
(74) *Attorney, Agent, or Firm* — Volpe Koenig

(57) ABSTRACT

A switchable water-saving valve including a water inlet substrate formed as an annular body which has a housing and a water inlet portion. The water inlet portion is fixedly arranged within the housing and has a water inlet and a water outlet extending therethrough. A flow channel substrate is fixedly arranged within the housing below the water inlet portion. Guide holes are formed circumferentially at intervals on the flow channel substrate and extend therethrough and are in fluid communication with the water outlet. A switch holder is rotatably positioned below the flow channel substrate. First and second pluralities of water flow holes are arranged circumferentially in the top surface of the switch holder and penetrate the top surface. Water outlet holes are formed on the bottom surface of an aerator holder and are in fluid communication with the first water flow holes. When the switch holder rotates to a first position where the first water flow holes are aligned with the guide holes, water flowing into the guide holes flows out of the water outlet holes through the first water flow holes.

17 Claims, 10 Drawing Sheets

(51) Int. Cl.
   *B05B 1/16*   (2006.01)
   *B05B 1/18*   (2006.01)
   *B05B 7/04*   (2006.01)
   *F16K 11/22*   (2006.01)

(58) Field of Classification Search
   CPC ....... B05B 1/1645; B05B 1/1654; B05B 1/18;
           B05B 7/0425; F16K 11/22; B01D 35/04
   See application file for complete search history.

(56) References Cited

U.S. PATENT DOCUMENTS

| | | | |
|---|---|---|---|
| 2009/0045370 A1* | 2/2009 | Kao | F16K 31/58 251/324 |
| 2012/0018661 A1* | 1/2012 | Kao | E03C 1/08 251/359 |
| 2014/0217314 A1* | 8/2014 | Kao | F16K 21/06 251/12 |
| 2014/0263756 A1 | 9/2014 | Meehen et al. | |
| 2014/0300010 A1* | 10/2014 | Zhou | E03C 1/084 261/78.2 |
| 2016/0298321 A1* | 10/2016 | Zhou | E03C 1/084 |
| 2018/0002906 A1* | 1/2018 | Huang | E03C 1/084 |
| 2018/0038085 A1* | 2/2018 | Birmelin | B05B 7/04 |
| 2019/0194918 A1* | 6/2019 | Schurle | E03C 1/084 |
| 2019/0376265 A1* | 12/2019 | Huang | B05B 1/169 |
| 2020/0131747 A1* | 4/2020 | Wu | E03C 1/086 |

FOREIGN PATENT DOCUMENTS

| | | |
|---|---|---|
| TW | 201736762 | 10/2017 |
| WO | 2016138981 | 9/2016 |

\* cited by examiner

SWITCHING-TYPE WATER SAVING VALVE

TECHNICAL FIELD

The invention relates to a water supply valve and in particular to a water supply valve that is installed at a water outlet end of a water supply pipe and suitable for switching water supply modes.

BACKGROUND

Conventional water valves, such as the press-type water valve described in patent application TW 201736762A, include an upper seat comprising a first flow passage and a second flow passage. A lower seat is located beneath the upper seat and has a through hole, and a circulation space is formed between the lower seat and the upper seat. A movable plug is arranged within the circulation space and movable up and down. A control unit is movable up or down according to user operation to open or close the through hole. When the control unit is in an open state, it is located at the lower end of its range of movement, and the movable plug is located at a lower portion of the circulation space so as to keep the through hole in an open state. When the control unit is in a closed state, it is located at the upper end of its range of movement and closes the through hole, and water flowing into the circulation space gradually pushes the movable plug against the lower surface of the upper seat and closes the second flow passage, so that positive and negative pressure waves generated when water flow stops can be reduced.

The press-type water valve overcomes problems of positive and negative pressure waves. However, as the water outlet is only provided with a single aerator to mix water with air and create aerated water so as to save water, when improved cleaning effect is desired, the water valve with the aerator cannot provide sufficient water pressure and flow to achieve that effect. Therefore, users would need remove or replace the water valve in order to increase water pressure and flow. This makes the valve inconvenient to use. Accordingly, such conventional press-type valves need to be improved in order to overcome the aforementioned problems and disadvantages.

SUMMARY

In view of the disadvantages and deficiencies of the state of the art, the present invention provides a switchable water-saving valve which allows a user to switch between two water supply modes by rotating a switch holder so as to selectively supply aerated water or shower/spray water and avoids the need to change valves.

In order to achieve the object of the invention, the technical solution adopted by the invention is a switchable water-saving valve, which comprises:

- a water inlet substrate in the form of an annular body which has a housing and a water inlet portion, wherein the housing is provided with external threads, and the water inlet portion is fixedly arranged within the housing and has at least one water inlet and at least one water outlet extending therethrough, the at least one water inlet being in fluid communication with the at least one water outlet;
- a flow channel substrate in the form of an annular body, which is fixedly arranged within the housing and located below the water inlet portion, wherein a plurality of guide holes is formed circumferentially in the flow channel substrate at intervals and penetrates the flow channel substrate, the guide holes in fluid communication with the water outlet;
- a switch holder in the form of an annular body, which is rotatably positioned below the flow channel substrate and has a top surface and a bottom surface, a plurality of first water flow holes and a plurality of second water flow holes are formed circumferentially in the top surface of the switch holder at intervals and penetrating the top surface;
- an aerator holder in the form of an annular body and arranged on the flow channel substrate, wherein the aerator holder is positioned within the switch holder and forms a gap between itself and the switch holder, a grid of water outlet holes is formed on the bottom surface of an aerator holder and are in fluid communication with the first water flow holes;
- wherein when the switch holder rotates to a first position where the first water flow holes are aligned with the guide holes, water flowing into the guide holes can flow out of the water outlet holes through the first water flow holes, and when the switch holder rotates to a second position where the second water flow holes are aligned with the guide holes, water flowing into the guide holes can flow out of the second water flow holes.

Further, in the switchable water-saving valve, the switch holder further comprises a plurality of guide channels formed as recesses on the top surface of the switch holder and located between the plurality of first water flow holes, and the plurality of guide channels are in fluid communication with the plurality of second water flow holes.

Further, the switch holder of the switchable water-saving valve has a bottom surface with a groove formed by a recess on the bottom surface; a plurality of sliding blocks protrudes from an inner wall of the groove; a sliding rail is formed on an outer wall of the aerator holder by a circumferential recess; the switch holder is sleeved onto the aerator holder, and the sliding blocks are movably located in the sliding rail.

Further, the switchable water-saving valve further comprises a rotatable ring. A plurality of anti-skid grooves is formed as recesses on an outer wall of the rotatable ring at intervals, and a plurality of clamping grooves is formed as recesses on an inner wall of the rotatable ring at intervals; a plurality of clamping blocks is formed as protrusions around an outer wall of the switch holder at intervals, the plurality of clamping grooves fitting onto the plurality of clamping blocks.

Further, the switchable water-saving valve further comprises a control unit located in the flow channel substrate; the control unit has a column-shaped body with a pressing portion and an operating portion; the pressing portion is located at one end of the control unit and is configured to selectively open or close the water outlet; the operating portion is located at the other end of the control unit and extends out of the flow channel substrate.

Further, the water inlet of the switchable water-saving valve comprises an outer ring, a substrate, a filter screen and a seal ring. The substrate has a column-shaped body and is positioned in the outer ring. The at least one water inlet channel penetrates the top surface and the bottom surface of the substrate. The bottom surface of the substrate has a recess and is provided with a water outlet channel which penetrates two opposite side walls of the substrate. A flow hole extends through the water outlet channel and is connected with the water inlet channel. The filter screen is arranged on the substrate to cover the at least one water inlet channel. The seal ring is arranged on the outer ring and wraps the periphery of the filter screen.

Further, the switchable water-saving valve further comprises a plug unit between the substrate and the flow channel substrate, the plug unit comprising a support portion and a seal portion. The support portion takes the form of an annular plate and has an upper surface on which a plurality of support ribs is formed to protrude from the upper surface. The seal portion also takes the form of an annular plate and has a top surface and a bottom surface. The seal portion has a positioning hole extending therethrough and can selectively seal or open the flow hole of the water outlet channel.

Further, in the switchable water-saving valve, an annular wall extends from the bottom surface of the flow channel substrate. A plurality of ribs is formed on the inner surface of the annular wall at intervals, thereby defining a plurality of guide grooves. The top end surface of each rib forms a slope. The operating portion comprises a movable member and an actuating member. The movable member has a hollow column body and is arranged at one end of the pressing portion. A plurality of protruding positioning blocks is form on an outer wall at the upper end of the movable member and abut the support portion. The actuating member has a column-shaped body, extends through the interior of the annular wall and is movable up and down therein. The bottom end of the actuating member protrudes outside the annular wall. A plurality of guide blocks is arranged around the actuating member and fits into the plurality of guide grooves. The top surface of each guide block forms a slope.

Further, outer threads are formed between the pressing portion of the control unit and the operating portion of the switchable water-saving valve. Inner threads are formed on the inner surface of the annular wall. The outer threads of the control unit are in threaded connection with the inner threads of the annular wall. A straight groove is formed on an end surface of the actuating member, which extends transversely through the center of the end surface.

Further, in the switchable water-saving valve, the pressing portion has a conical body and has an outer diameter greater than an inner diameter of the water outlet.

The invention has a number of advantages. A user can switch between an open state and a closed state of the value by pressing the actuating member. Pressing operation reduces the area of contact by hand on the switch, thereby reducing the number of residual bacteria and improving hygiene. Additionally, a user can switch the water outlet mode of the valve between an aeration mode and a shower/spray mode by holding and rotating a rotatable ring. Under the aeration mode, water consumption can be reduced by the effect of aeration; under the spray mode, water pressure can be increased to improve cleaning effect and, at the same time, water consumption can be reduced.

DETAILED DESCRIPTION

Technical features of the present invention are further described below in connection with the accompanying drawings and preferred embodiments of the present invention.

Figure 1:
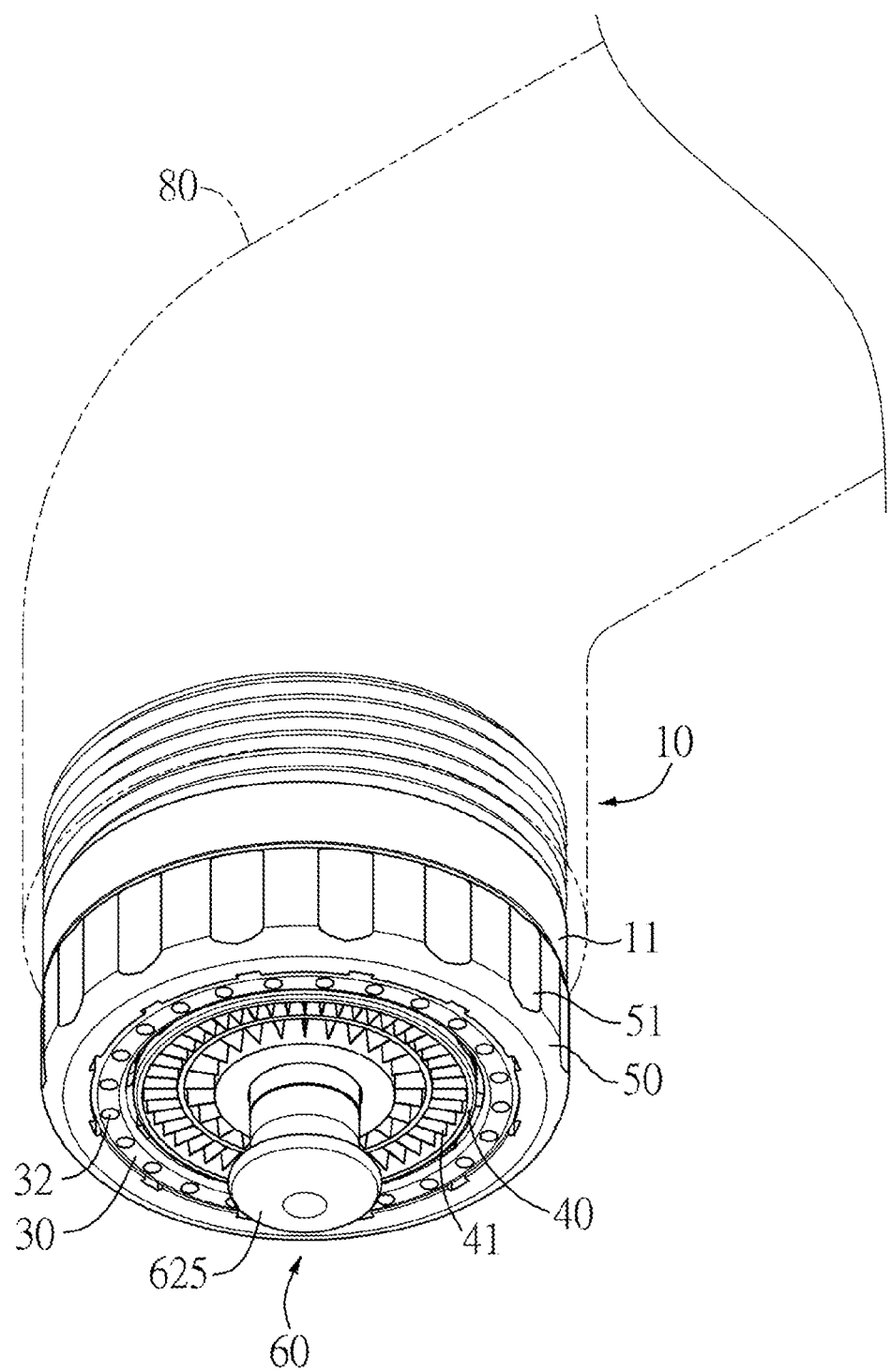
FIG. 1 is a schematic diagram of a first embodiment of the present invention.
Figure 2:
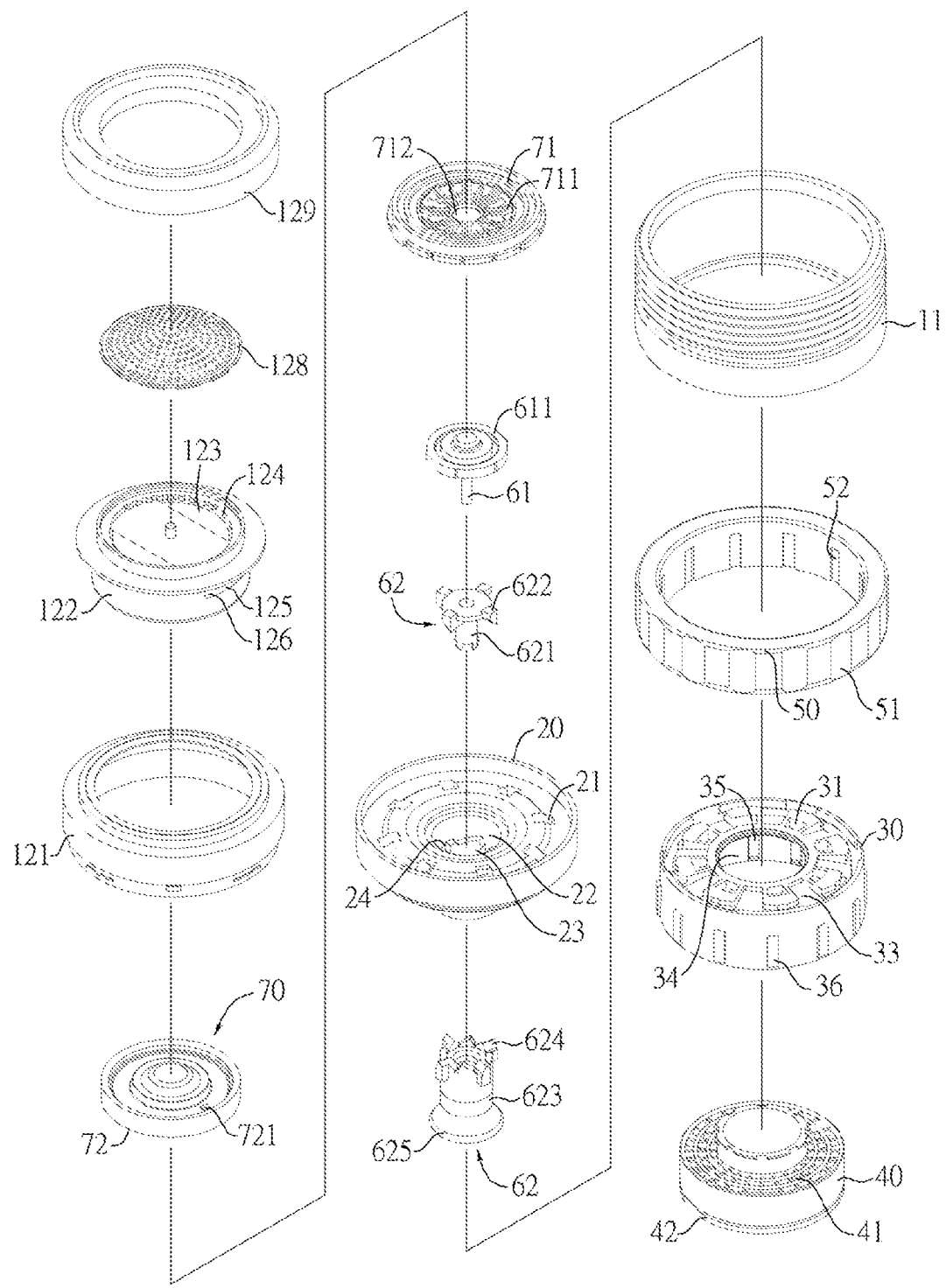
FIG. 2 is an exploded view of the first embodiment of the present invention.

Referring to FIGS. 1 and 2, a first embodiment of a switchable water-saving valve of the present invention comprises a water inlet substrate 10, a flow channel substrate 20, a switch holder 30, an aerator holder 40, a rotatable ring 50, a control unit 60 and a plug unit 70.

Figure 3:
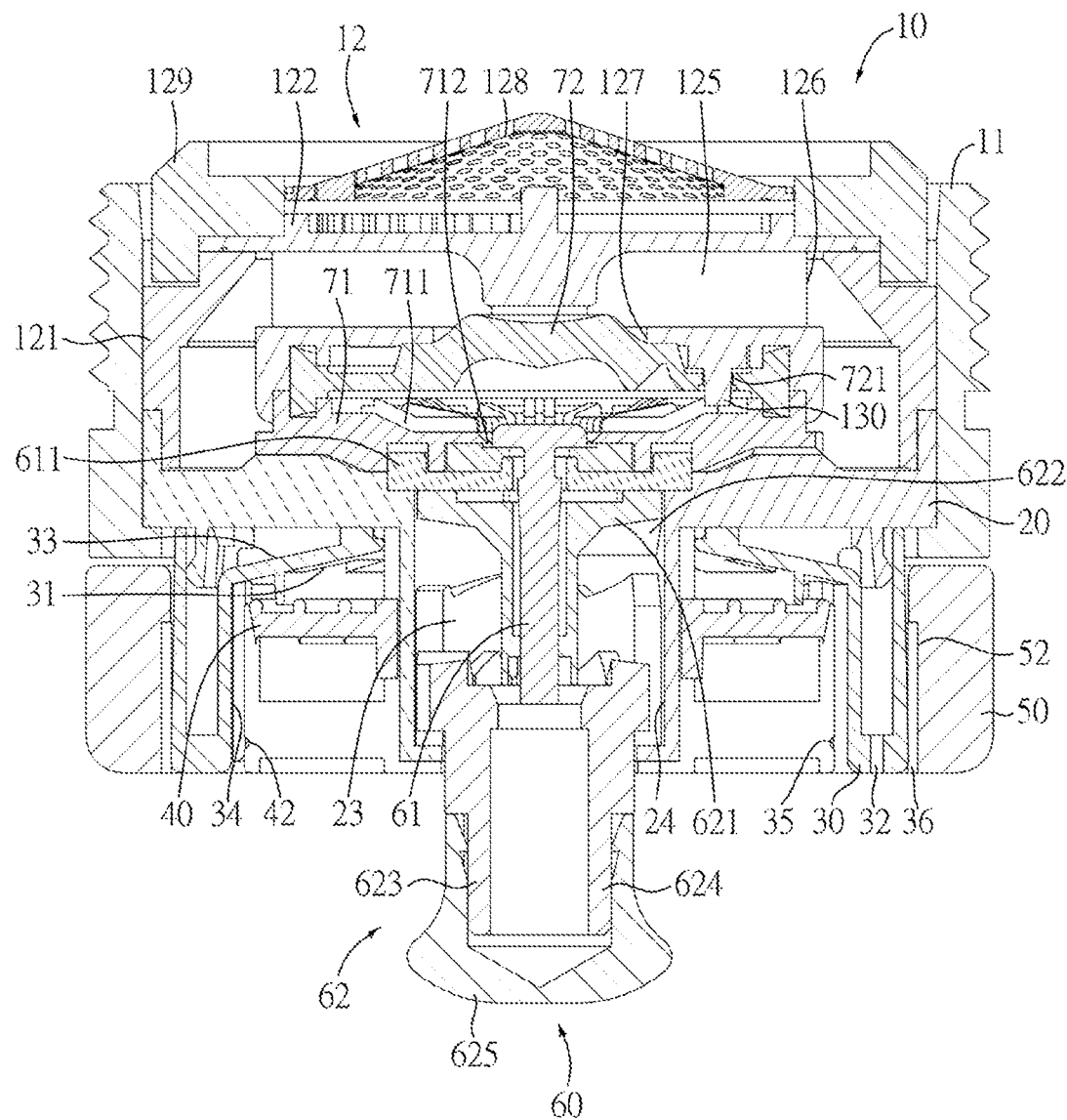
FIG. 3 is a cross-sectional view of the first embodiment of the present invention.
Figure 4:
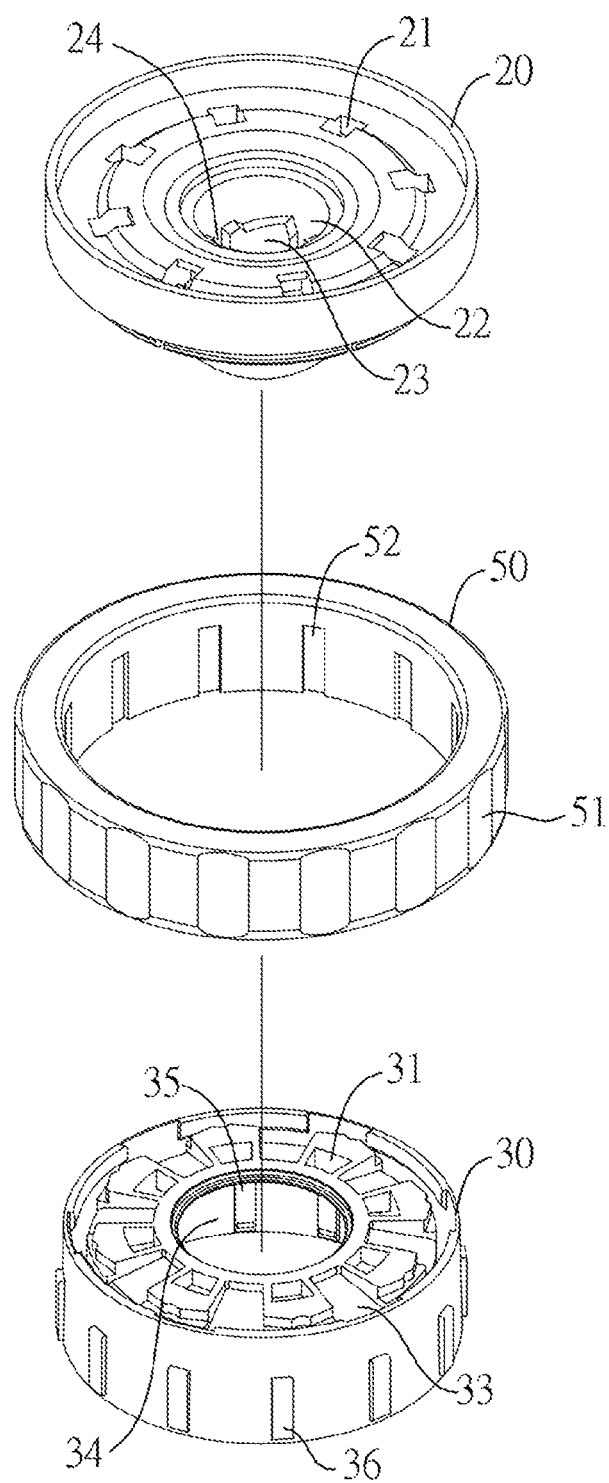
FIG. 4 is a partial exploded view of the first embodiment of the present invention.
Figure 5:
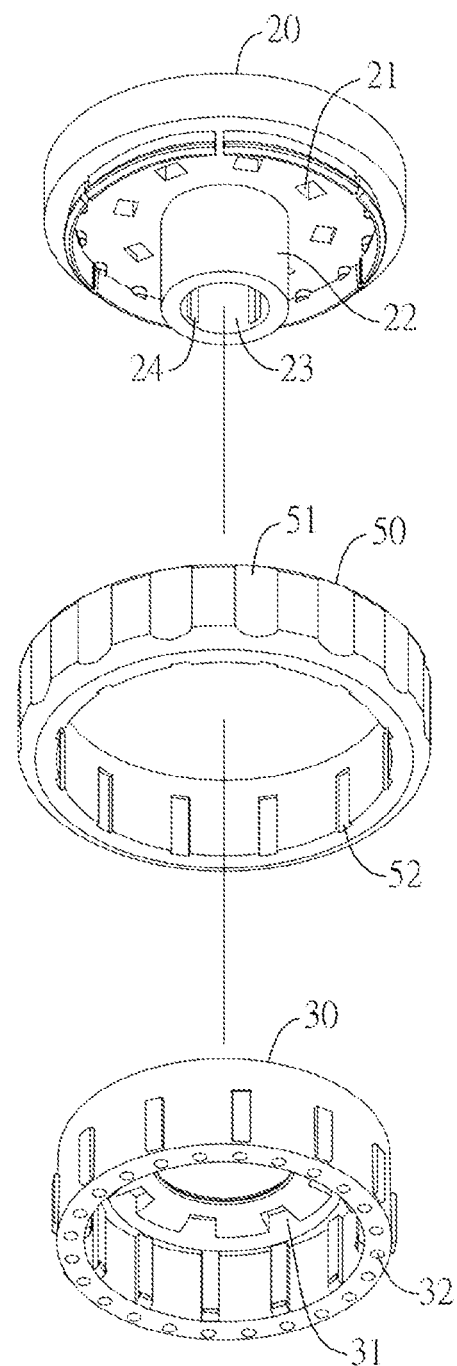
FIG. 5 is a partial exploded view of the first embodiment of the present invention from another perspective.

Referring to FIGS. 2 and 3, the water inlet substrate 10 is an annular body and includes a housing 11 and a water inlet portion 12. The housing 11 has a hollow cylindrical body. Its outer wall surface is provided with external threads, which are used to connect the switchable water-saving valve with a water outlet pipe 80 shown in FIG. 1 via internal threads (not shown in the drawings) formed on an inner surface of the outlet.

The water inlet portion 12 includes an outer ring 121, a substrate 122, a filter screen 128, and a seal ring 129. The outer ring 121 has an annular body with a top end and a bottom end. A plurality of fixing members is formed circumferentially on the outer surface as protrusions near the bottom end of the outer ring 121. The substrate 122 has a column-shaped body and fits in the outer ring 121. Two water inlet channels 123 are formed at two opposite side portions on the top surface of the substrate 122. Openings of the water inlet channels 123 at the top surface form water inlets 124. The bottom surface of the substrate 122 has a recess and is provided with a water outlet channel 125. The water outlet channel 125 has a pipe body formed at the bottom surface of the substrate 122 and extends through two sides of the substrate 122 at positions removed from the two water inlet channels 123. Two ends of the water outlet channel 125 penetrate side walls of the substrate 122 and form water outlets 126. A flow hole 127 is formed at and penetrates the bottom end of the water outlet channel 125 inside the substrate 122. The flow hole 127 connects the water inlet channels 123 and the water outlet channel 125. Water can flow into water inlet channels 123 via the water inlets 124, to the water outlet channel 125 via the flow hole 127, and then out from the water outlets 126 of the water outlet channel 125 to release pressure. The filter screen 128 is a plate member having a plurality of through holes, which is fixedly arranged on the top surface of the substrate 122 and covers the water inlets 124 such that water can only enter the water inlets 124 via the through holes in the filter screen 128. The seal ring 129 has an annular body that sleeves onto the outer ring 121 and wraps the periphery of the filter screen 128, such that, when the switchable water-saving valve is installed in the water outlet pipe 80, water leakage between the outer surface of the switchable water-saving valve and the inner surface of the water outlet pipe 80 can be prevented.

Referring to FIGS. 2-5, the flow channel substrate 20 has an annular body with a top surface and a bottom surface. A recess is provided on the top surface of the flow channel substrate 20 to form a groove, which tightly match and fit with the fixing members surrounding the outer ring 121. A plurality of guide holes 21 is arranged circumferentially on the top surface of the flow channel substrate 20 at intervals. A through hole is formed at the center of the bottom surface of the flow channel substrate 20, and an annular wall 22 surrounds and extends from the through hole. A plurality of protruding ribs 23 is provided on the inner surface of annular wall 22 and defines a plurality of guide grooves 24 therebetween, i.e., the protruding ribs 23 and the guide grooves are interspersed along the circumference of the annular wall 23. The top end surface of each protruding rib 23 forms a slope.

The switch holder 30 is an annular body and is rotatably positioned below the flow channel substrate 20. The switch holder 30 has a top surface and a bottom surface. A plurality of first water flow holes 31 penetrates the top surface of the switch holder 30, the first water flow holes 31 arranged circumferentially on the top surface at intervals. A plurality of guide channels 33 is formed as recesses on the top surface between the first water flow holes 31. An annular groove is formed on the top surface outside the first water flow holes 31 and near the periphery of the top surface. A plurality of second water flow holes 32 is provided at the bottom of the ring groove at intervals. The second water flow holes 32 are connected with the guide channels 33. In particular, the height of the guide channel 33 near the center of the top surface is greater than that near the periphery of the top surface, thereby allowing water to flow to the annular groove via the guide channels 33 and flow out from the second water flow holes 32. A recess is provided at the bottom surface of the switch holder 30 to form an annular groove portion 34. A plurality of sliding blocks 35 is arranged on the inner wall surface of the annular groove portion 34 at intervals along the circumference of the annular groove portion. The sliding blocks 35 are elongated members extending horizontally. A plurality of protruding clamping blocks 36 is formed on the outer wall surface of the switch holder 30 at intervals along the circumference of the switch holder 30. The clamping blocks are elongated members extending between the top surface and the bottom surface of the switch holder 30.

Referring to FIGS. 1, 2, 3 and 6, the aerator holder 40 has an annular body and is fixedly arranged below the flow channel substrate 20. The aerator holder 40 is located below the switch holder 30 and housed within the inner wall surface of the annular groove. The bottom surface of the aerator holder 40 is provided with a grid of radially extending water outlet holes 41. The water outlet holes 41 are connected with the first water flow holes 31. A gap is formed between the aerator holder 40 and the switch holder 30, which allows air to flow in and mix with water flowing through the first waterflow holes 31 to form aerated water. The outer wall surface of the aerator holder 40 is provided with a circumferential recess to form a slide rail 42. The switch holder 30 sleeves onto the aerator holder 40, and the sliding blocks 35 are movably fit in the slide rail 42, such that the switch holder 30 is rotatable relative to the aerator holder 40.

The rotatable ring 50 has an annular body, and recesses are provided on the outer wall surface of the rotatable ring 50 at intervals to form a plurality of anti-skid grooves 51, allowing fingers of a user to contact the anti-skid grooves 51 for firm handling. A plurality of clamping grooves 52 is formed as recesses positioned along the periphery of the inner wall surface of the rotatable ring 50 at intervals. The clamping grooves 52 are grooves extending in the up-down direction, and the shape of the clamping grooves 52 corresponds to the shape of the clamping blocks 36. The clamping grooves 52 can clamp onto the clamping blocks 36 on the outer wall surface of the switch holder 30, so that the rotatable ring 50 can be rotated by an external force to drive the switch holder 30 to rotate. When the switch holder 30 is rotated to a first position where the first water flow holes 31 are aligned with the guide holes 21 respectively, water flowing through the guide holes 21 flows from the first waterflow holes 31 to and out of the water outlet holes 41 on the bottom surface of the aerator holder 40, and is mixed with air to form aerated water. When the switch holder 30 is rotated to a second position where the second water flow holes 32 are aligned the guide holes 21 respectively, water flowing through the guide holes 21 flows out of the second water flow holes 32. Since the second water flow holes 32 are spaced apart from each other and arranged circumferentially, effluent water can form a water flow like in a shower head.

The control unit 60 has a cylindrical body with a pressing portion 61 and an operating portion 62. The pressing portion 61 has a column-shaped body, one end of which is provided with an abutting member 611 in the form of is a circular plate. The operating portion 62 includes a movable member 621 and an actuating member 623. The movable member is a hollow column body configured to be fixed to the other end of the pressing portion 61. A plurality of positioning blocks 622 is formed as protrusions arranged circumferentially outside an end portion of the movable member 621 near the pressing portion 61 at intervals. Top surfaces of the positioning blocks 622 abut abutting member 611. The bottom surface of each positioning block forms a slope. The actuating member 623 has a hollow column body and a range of movement running vertically through the annular wall 22 of the flow channel substrate 20. The bottom end of the actuating member 623 extends out of the annular wall 22 and forms a pressing member 625, which has an outer diameter greater than the outer diameter of the plug unit 70. A plurality of protruding guide blocks 624 is provided circumferentially at the top end of the actuating member 623. The guide blocks 624 are held in the guide grooves 24 of the flow channel substrate 20, so that the actuating member 623 and the flow channel substrate 20 do not rotate relative to each other. The top surface of each guide block 624 forms a slope that corresponds to the slope of the bottom surface of the corresponding movable member 621. The actuating member 623 can pushed by an external force applied on its bottom end to move to the upper end of its range of movement and abut the movable member 621 and fall to the lower end of its range of movement under gravity. Accordingly, the abutting member 611 can be pressed against the operating portion 62 by an external force and cooperate with the protruding ribs 23 on the annular groove 22 of the flow channel substrate 20 to rotate, so as to secure the abutting member 611 at different heights. The control unit is modified based on standard switch mechanisms.

The plug unit 70 includes a support portion 71 and a seal portion 72. The support portion 71 has an annular body with an upper surface and a lower surface. A plurality of protruding support ribs 711 is formed on the upper surface of the support portion 71. A through hole 712 is formed at the center of the support portion 71, and the support ribs 711 extend radially outward from the through hole 712 at the center. The seal portion 72 is an annular plate and has a top surface, a bottom surface, and a positioning hole 721 extending therethrough. A convex portion is formed at the top surface of the seal portion 72 and is shaped to correspond to the shape of the flow hole 127 of the water outlet channel 125 and has an outer diameter greater than the inner diameter of the flow hole 127. In this embodiment, the abutting member 611 can selectively open or close the through hole 712. A positioning rod 130 is provided at the bottom of the substrate 122. The positioning hole 721 sleeves onto the positioning rod 130, and the seal portion 72 can move up and down along the positioning rod 130, so as to selectively seal or open the flow hole 127 with the convex portion. Movement of the actuating member 623 can drive the abutting member 611 and the seal portion 72 to cooperate with the water flow so as to open and close water supply. Movement of the seal portion 72 and seal of the flow hole 127 are modified based on operation of standard components for reducing positive and negative pressure waves.

Figure 6:
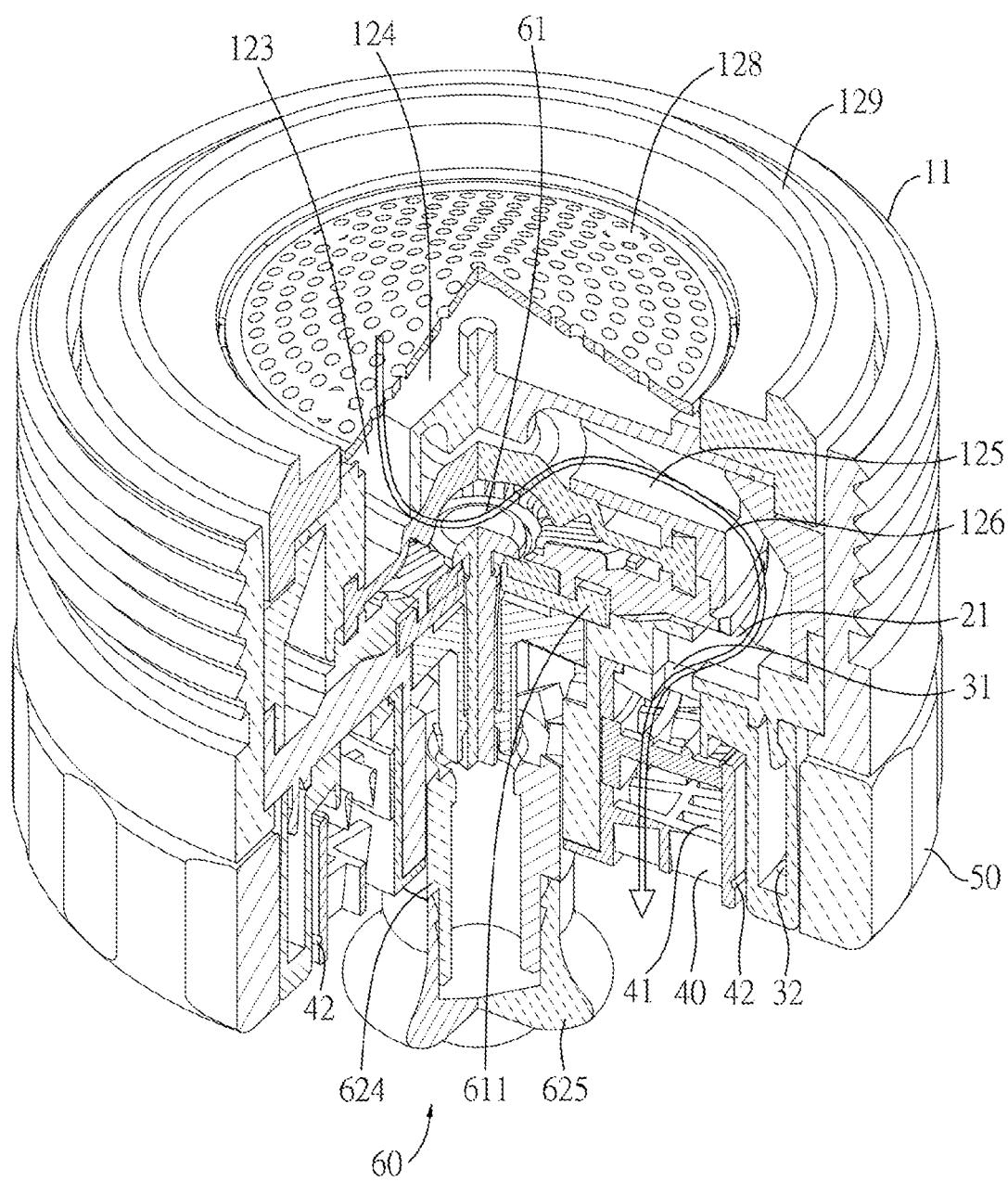
FIG. 6 is a partial cross-sectional view of the first embodiment of the present invention when the guide holes are aligned with the first water flow holes.
Figure 7:
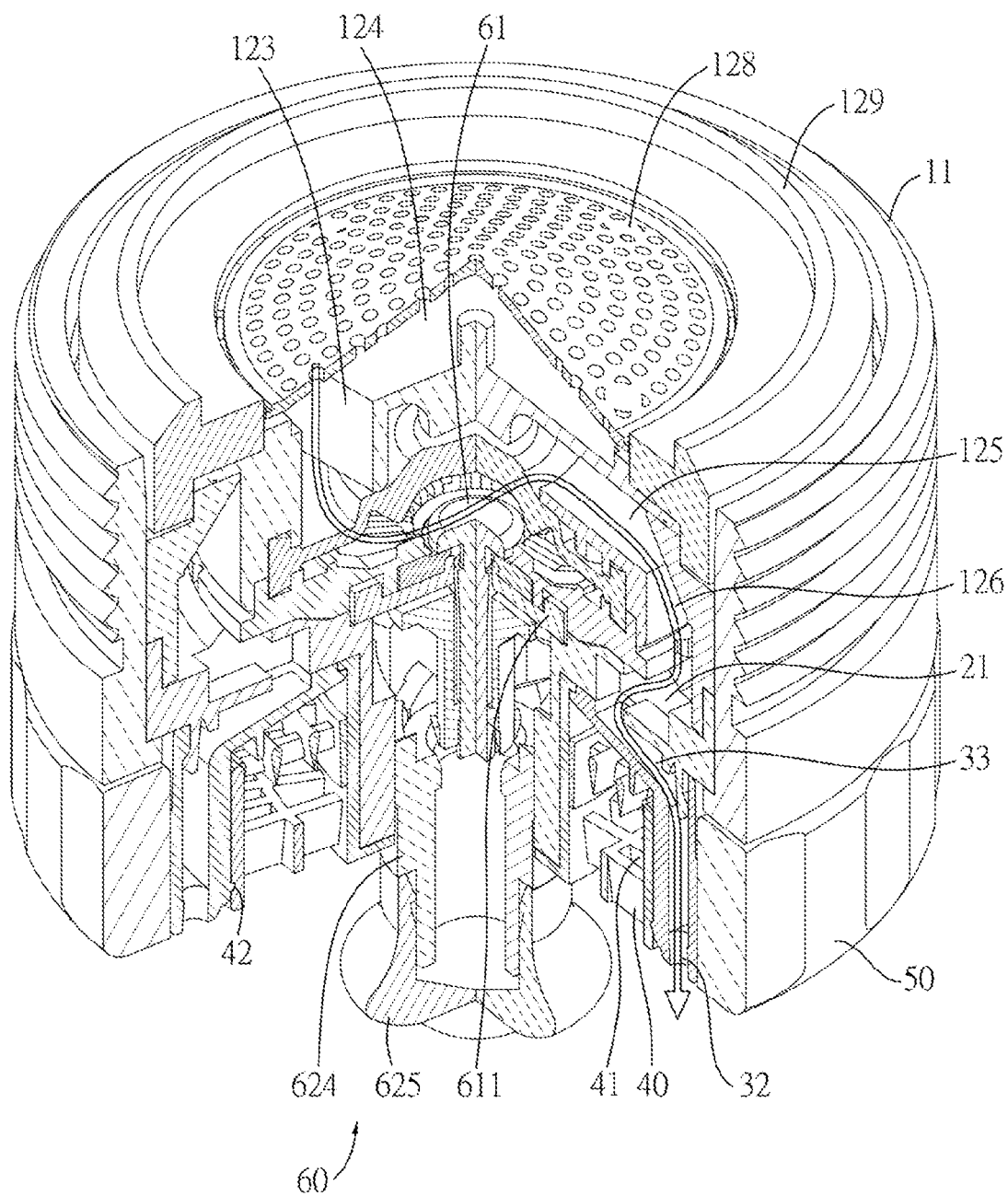
FIG. 7 is a partial cross-sectional view of the first embodiment of the present invention when the guide holes are aligned with the second water flow holes.

Referring to FIGS. 1 and 2, when in use, the switchable water-saving valve of the present invention can be fit into an outlet of a water outlet pipe 80 and function both as an on/off switch for water supply and as a selection mechanism for water output modes. When used as an on/off switch, a user can select on or off state by pressing actuating member 623. When used as a selection mechanism for water output modes, a user can hold and rotate rotatable ring 50 so as to selectively align the guide holes 21 with the first water flow holes 31 or the second water flow holes 32. As shown in FIG. 6, when the guide holes 21 are aligned with the first water flow holes 31, aerated water can be output from the valve so as to reduce water consumption by the effect of aeration. As shown in FIG. 7, when the guide holes 21 are aligned with the second water flow holes 32, a shower like water flow can be output from the valve. Under the shower/spray mode, water pressure can be increased while water consumption is reduced. Accordingly, a user can select different water output modes based on specific needs and achieve the goal of reducing water consumption.

Figure 8:
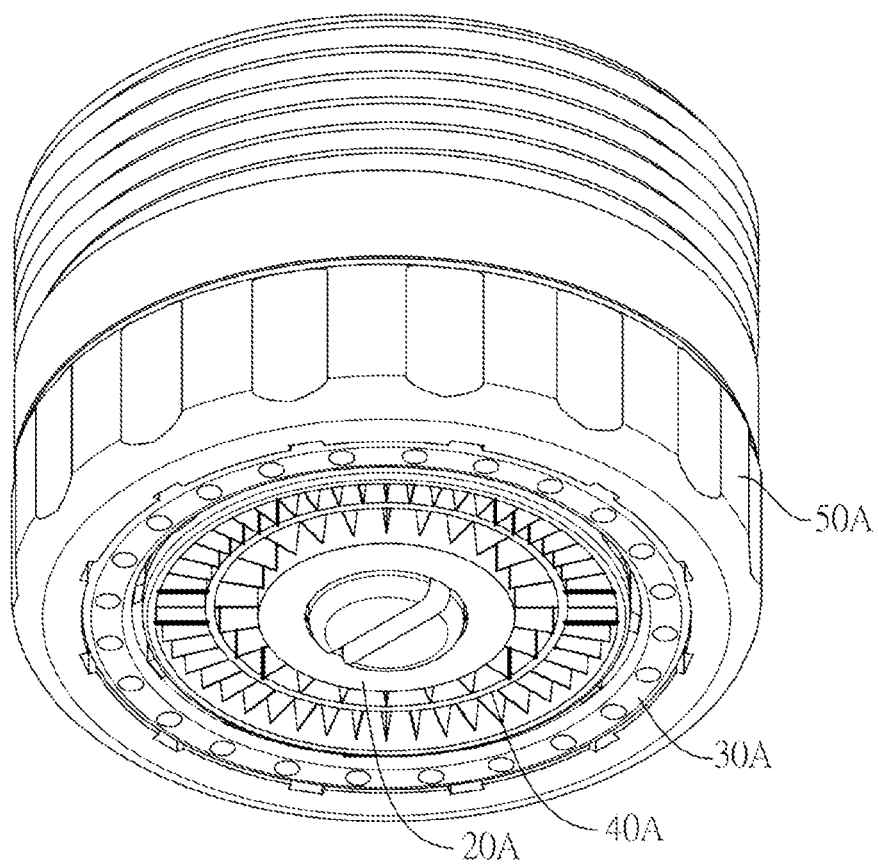
FIG. 8 is a perspective view of a second embodiment of the present invention.
Figure 9:
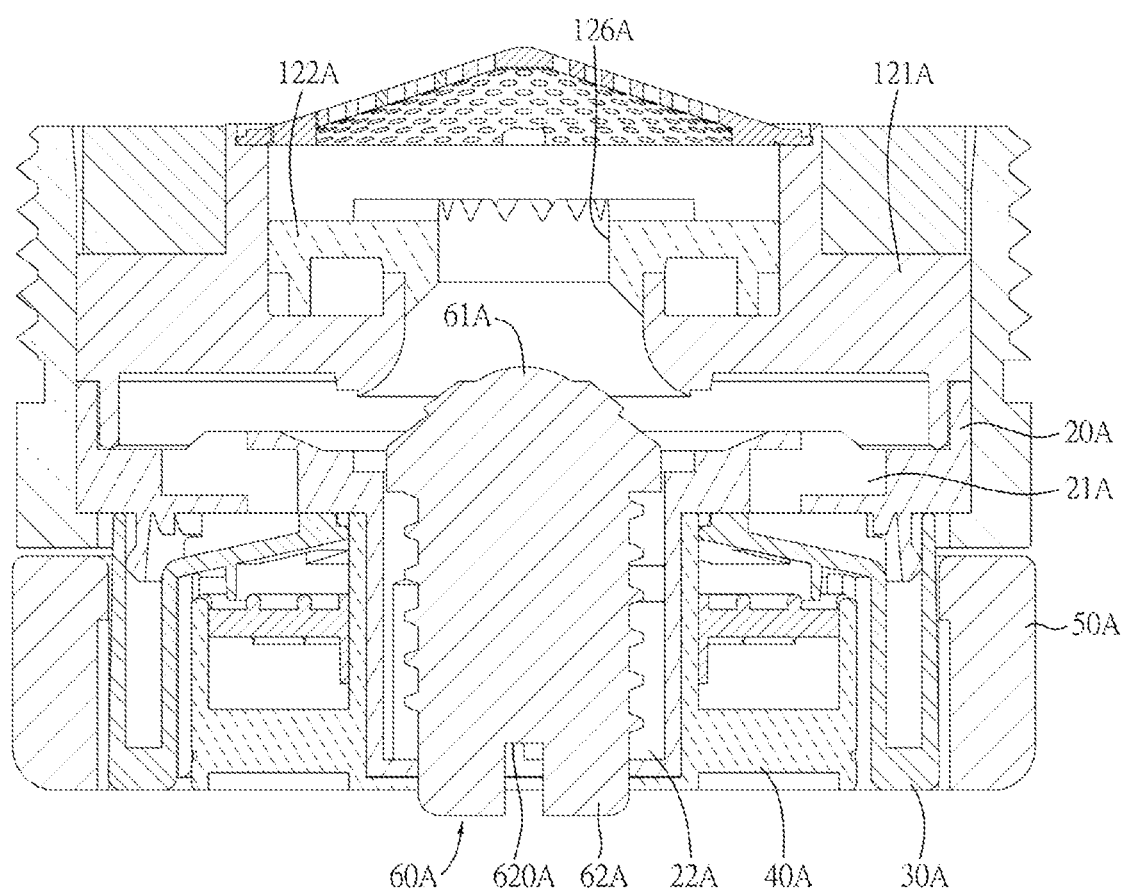
FIG. 9 is a cross-sectional view of the second embodiment of the present invention.

FIG. 8 and FIG. 9 show a second embodiment of the present invention. In this embodiment, flow channel substrate 20A, switch holder 30A, aerator holder 40A and rotatable ring 50A are the same as corresponding parts in the first embodiment. The second embodiment differs from the first embodiment mainly in the following aspects. Substrate 122A is a plate member and has a water outlet 126A extending therethrough. The substrate 122A is fixedly arranged on an outer ring 121A and, together with the outer ring 121A and the flow channel substrate 20A, defines an interior space. The interior space is connected with the water outlet 126A and guide holes 21A of the flow channel substrate 20A.

External threads are formed between pressing portion 61A and operating portion 62A of control unit 60A. Internal threads are formed on the inner wall surface of annular wall 22A on the flow channel substrate 20A. The control unit 60A is connected to the inner surface of the annular wall 22A via the external and internal threads, thereby allowing the control unit 60A to move up and down within the annular wall 22A. A straight groove 620A is formed as a recess on an end surface of the operating portion 62A and extends transversely through the center of the end surface.

In this embodiment, the straight groove 620A is configured to allow a screwdriver to fit in and to rotate and drive the control unit 60A up and down along the direction of the threads. When the control unit 60A moves to the top end, the water outlet 126A is closed by the pressing portion 61A so as to turn off water supply. When the control unit 60A moves toward the bottom end, the water flow can be controlled by adjusting the distance between the pressing portion 61A and the water outlet 126A.

Figure 10:
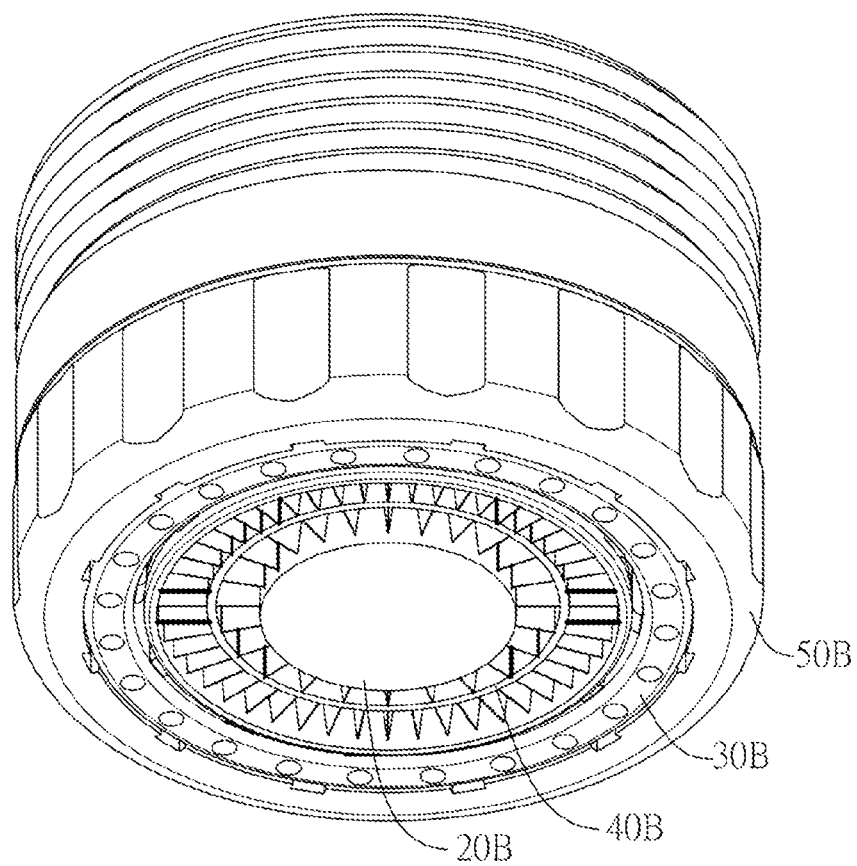
FIG. 10 is a perspective view of a third embodiment of the present invention.

Referring now to FIG. 10, a third embodiment of the present invention is shown. Switch holder 30B, aerator holder 40B and rotatable ring 50B are the same as corresponding parts in the second embodiment. The main difference lies in that flow channel substrate 20B only includes guide holes (not shown in the drawing). Water can flow into the interior space and flow out from the guide holes. In other words, the present embodiment does not have the on/off switch function and water flow adjustment function of the second embodiment.

The embodiments described above are merely preferred examples to show the structure and operation of the present invention and are not to be interpreted to limit the scope of the invention. Those skilled in the art would readily understand that various modifications and alterations of the technical details described above may be made and applied to achieve the same or equivalent technical results. Such modifications, alterations and equivalents would still be based on the disclosure of the present invention and would not depart from the scope of the invention.

| Description of Reference Numerals | |
|---|---|
| 10 Water inlet substrate | 11 Housing |
| 12 Water inlet portion | 121, 121A Outer ring |
| 122, 122A Substrate | 123 Water inlet channels |
| 124 Water inlets | 125 Water outlet channel |
| 126, 126A Water outlets | 127 Flow hole |
| 128 Filter screen | 129 Seal ring |
| 130 Positioning rod | |
| | 130 Positioning rod |
| 20, 20A, 20B Flow channel substrate | 21, 21A Guide holes |
| 22, 22a Annular wall | 23 Protruding ribs |
| 24 Guide grooves | 30, 30A, 30B Switch holder |
| 31 First water flow holes | 32 Second water flow holes |
| 33 Guide channels | 34 Annular groove portion |
| 35 Sliding blocks | 36 Clamping blocks |
| 40, 40a, 40b Aerator holder | 41 Water outlet holes |
| 42 Slide rail | 50, 50A, 50B Rotatable ring |
| 51 Anti-skid grooves | 52 Clamping grooves |
| 60, 60a Control unit | 61, 61A Pressing portion |
| 611 Abutting member | 62, 62A Operating portion |
| 620A Straight groove | 621 Movable member |
| 622 Positioning Blocks | 623 Actuating member |
| 624 Guide Blocks | 625 Pressing member |
| 70 Plug unit | 71 Support portion |
| 711 Support ribs | 712 Through hole |
| 72 Seal portion | 721 Positioning hole |
| 80 Water outlet pipe | |

The invention claimed is:

1. A switchable water-saving valve, comprising:
   a water inlet substrate including a housing and a water inlet portion, the housing has a ring-shaped body with external threads, the water inlet portion is fixedly arranged in the housing and has at least one water inlet and at least one water outlet extending through the water inlet portion, and the at least one water inlet is in fluid communication with the at least one water outlet;
   a flow channel substrate having an annular body, a plurality of guide holes is arranged circumferentially around the flow channel substrate at intervals and extends through the flow channel substrate, and the guide holes in fluid communication with the at least one water outlet;
   a switch holder having an annular body and rotatably positioned in the housing, the switch holder has a top surface and a bottom surface, and a plurality of first water flow holes and a plurality of second water flow holes are arranged circumferentially around the top surface at intervals and extend through the top surface;

an aerator holder having an annular body, wherein the aerator holder is positioned in the switch holder and forms a gap between the aerator holder and the switch holder, and a grid of water outlet holes is formed in a bottom surface of the aerator holder, the water outlet holes in fluid communication with the plurality of first water flow holes; the switch holder is rotatable to a first position in which the plurality of first water flow holes is aligned with the plurality of guide holes respectively, and water flowing into the plurality of guide holes flows through the plurality of first water flow holes and out of the water outlet holes; and the switch holder is rotatable to a second position in which the plurality of second water flow holes is aligned with the plurality of guide holes respectively, and water flowing into the plurality of guide holes flows out of the plurality of second water flow holes.

2. The switchable water-saving valve of claim 1, wherein the switch holder further comprises a plurality of guide channels formed as recesses on the top surface of the switch holder and positioned between the plurality of first water flow holes, and the plurality of guide channels are in fluid communication with the plurality of second water flow holes.

3. The switchable water-saving valve of claim 1, further comprising a groove formed as a recess in the bottom surface of the switch holder;

a plurality of sliding blocks is arranged circumferentially on an inner wall surface of the groove at intervals;

a sliding rail is formed as a recess around an outer wall surface of the aerator holder; and the switch holder is sleeved onto the aerator holder with the plurality of sliding blocks movably accommodated in the sliding rail.

4. The switchable water-saving valve of claim 3, further comprising a rotatable ring having an annular body;

a plurality of anti-skid grooves formed as recesses arranged circumferentially on an outer wall surface of the rotatable ring at intervals;

a plurality of clamping grooves formed as recesses arranged circumferentially on an inner wall surface of the rotatable ring at intervals;

a plurality of clamping blocks formed as protrusions arranged circumferentially on an outer wall surface of the switch holder at intervals; and the plurality of clamping grooves clamp onto the plurality of clamping blocks respectively.

5. The switchable water-saving valve of claim 4, further comprising a control unit located in the flow channel substrate, the control unit has a column-shaped body with a pressing portion and an operating portion;

the pressing portion is located at one end of the control unit and configured to selectively open or close the at least one water outlet; and the operating portion is located at an other end of the control unit and extends out of the flow channel substrate.

6. The switchable water-saving valve of claim 5, wherein:

the water inlet portion comprises an outer ring, a substrate, a filter screen and a seal ring;

the outer ring has an annular body;

the substrate has a column-shaped body and is arranged in the outer ring;

at least one water inlet channel extends through a top surface and a bottom surface of the substrate;

the bottom surface of the substrate has a recess and is provided with a water outlet channel, the water outlet channel having two ends penetrating opposite side walls of the substrate;

a flow hole extends through the water outlet channel and is connected with the at least one water inlet channel;

the filter screen is arranged on the substrate to cover the at least one water inlet channel; and the seal ring is arranged on the outer ring and wraps a periphery of the filter screen.

7. The switchable water-saving valve of claim 6, further comprising a plug unit positioned between the substrate and the flow channel substrate, the plug unit comprises a support portion and a seal portion;

the support portion is an annular plate with an upper surface;

a plurality of support ribs is formed as protrusions from the upper surface of the support portion;

the seal portion is an annular plate with a top surface and a bottom surface; and the seal portion has a positioning hole extending therethrough and is configured to selectively seal or open the flow hole of the water outlet channel.

8. The switchable water-saving valve of claim 7, wherein an annular wall protrudes from a bottom surface of the flow channel substrate;

a plurality of ribs is formed circumferentially on an inner surface of the annular wall at intervals, thereby defining a plurality of guide grooves between the ribs, a top end surface of each rib forming a slope;

the operating portion comprises a movable member and an actuating member;

the movable member has a hollow column body and is arranged at one end of the pressing portion;

a plurality of positioning blocks is formed as protrusions from an outer wall at an upper end of the movable member, with the positioning blocks abutting the support portion;

the actuating member has a column-shaped body, extends through an interior of the annular wall and is movable up and down therein;

a bottom end of the actuating member protrudes outside the annular wall; and a plurality of guide blocks is formed as protrusions around the actuating member and fits into the plurality of guide grooves, with a top surface of each said guide block forming a slope.

9. The switchable water-saving valve of claim 7, further comprising an annular wall protruding from a bottom surface of the flow channel substrate;

outer threads formed between the pressing portion and the operating portion of the control unit;

inner threads formed on an inner surface of the annular wall;

wherein the outer threads of the control unit are in threaded connection with the inner threads of the annular wall; and a straight groove is formed on an end surface of the operating portion and extends transversely through a center of the end surface.

10. The switchable water-saving valve of claim 9, wherein the pressing portion has a conical body with an outer diameter greater than an inner diameter of the at least one water outlet.

11. The switchable water-saving valve of claim 1, further comprising
- a rotatable ring having an annular body;
- a plurality of anti-skid grooves formed as recesses arranged circumferentially on an outer wall surface of the rotatable ring at intervals;
- a plurality of clamping grooves formed as recesses arranged circumferentially on an inner wall surface of the rotatable ring at intervals;
- a plurality of clamping blocks formed as protrusions arranged circumferentially on an outer wall surface of the switch holder at intervals; and
- the plurality of clamping grooves clamp onto the plurality of clamping blocks respectively.

12. The switchable water-saving valve of claim 1, further comprising
- a control unit located in the flow channel substrate, the control unit has a column-shaped body with a pressing portion and an operating portion;
- the pressing portion is located at one end of the control unit and configured to selectively open or close the at least one water outlet; and
- the operating portion is located at another end of the control unit and extends out of the flow channel substrate.

13. The switchable water-saving valve of claim 12, wherein:
- the water inlet portion comprises an outer ring, a substrate, a filter screen and a seal ring;
- the outer ring has an annular body;
- the substrate of the water inlet portion has a column-shaped body and is arranged in the outer ring;
- at least one water inlet channel extends through a top surface and a bottom surface of the substrate of the water inlet portion;
- the bottom surface of the substrate of the water inlet portion has a recess and is provided with a water outlet channel, the water outlet channel having two ends penetrating opposite side walls of the substrate of the water inlet portion;
- a flow hole of the water outlet channel extends through the water outlet channel and is connected with the at least one water inlet channel;
- the filter screen is arranged on the substrate of the water inlet portion to cover the at least one water inlet channel; and
- the seal ring is arranged on the outer ring and wraps a periphery of the filter screen.

14. The switchable water-saving valve of claim 13, further comprising
- a plug unit positioned between the substrate of the water inlet portion and the flow channel substrate, the plug unit comprises a support portion and a seal portion;
- the support portion is an annular plate with an upper surface;
- a plurality of support ribs is formed as protrusions from the upper surface of the support portion;
- the seal portion is an annular plate with a top surface and a bottom surface; and
- the seal portion has a positioning hole extending therethrough and is configured to selectively seal or open the flow hole of the water outlet channel.

15. The switchable water-saving valve of claim 11, wherein
- an annular wall protrudes from a bottom surface of the flow channel substrate;
- a plurality of ribs is formed circumferentially on an inner surface of the annular wall at intervals, thereby defining a plurality of guide grooves between the ribs, a top end surface of each rib forming a slope;
- the operating portion comprises a movable member and an actuating member;
- the movable member has a hollow column body and is arranged at one end of the pressing portion;
- a plurality of positioning blocks is formed as protrusions from an outer wall at an upper end of the movable member, with the positioning blocks abutting the support portion;
- the actuating member has a column-shaped body, extends through an interior of the annular wall and is movable up and down therein;
- a bottom end of the actuating member protrudes outside the annular wall; and
- a plurality of guide blocks is formed as protrusions around the actuating member and fits into the plurality of guide grooves, with a top surface of each said guide block forming a slope.

16. The switchable water-saving valve of claim 14, further comprising
- an annular wall protruding from a bottom surface of the flow channel substrate;
- outer threads formed between the pressing portion and the operating portion of the control unit;
- inner threads formed on an inner surface of the annular wall;
- wherein the outer threads of the control unit are in threaded connection with the inner threads of the annular wall; and
- a straight groove is formed on an end surface of the operating portion and extends transversely through a center of the end surface.

17. The switchable water-saving valve of claim 12, wherein the pressing portion has a conical body with an outer diameter greater than an inner diameter of the at least one water outlet.

* * * * *